United States Patent
Quiroz (10) Patent No.: US 9,970,792 B2
(45) Date of Patent: May 15, 2018

(54) STEPPER MOTOR ASSEMBLY HAVING OPPOSITE SHAFTS

(71) Applicant: Continental Automotive Systems, Inc., Auburn Hills, MI (US)

(72) Inventor: Luis Ernesto Quiroz, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 99 days.

(21) Appl. No.: 14/456,564

(22) Filed: Aug. 11, 2014

(65) Prior Publication Data

US 2016/0041012 A1 Feb. 11, 2016

(51) Int. Cl.
| | |
|---|---|
| *G01D 13/08* | (2006.01) |
| *G01D 13/04* | (2006.01) |
| *G01D 13/02* | (2006.01) |
| *H02K 16/00* | (2006.01) |
| *H02K 7/116* | (2006.01) |
| *H02K 37/00* | (2006.01) |
| *H02P 8/00* | (2006.01) |

(52) U.S. Cl.
CPC ............. *G01D 13/08* (2013.01); *G01D 13/04* (2013.01); *G01D 13/02* (2013.01); *H02K 7/116* (2013.01); *H02K 16/00* (2013.01); *H02K 37/00* (2013.01); *H02P 8/00* (2013.01)

(58) Field of Classification Search
CPC ........ G01D 13/08; G01D 13/02; G01D 13/04; H02K 16/00; H02K 7/116; H02K 37/00; H02P 8/00

USPC ............ 116/281–286, 300, DIG. 6, DIG. 36; 310/49.01, 46, 112, 114

See application file for complete search history.

(56) References Cited

U.S. PATENT DOCUMENTS 3,109,167 A * 10/1963 MacIntyre ............... G08B 5/30
310/49.43
3,135,886 A * 6/1964 Kavanaugh ............ H02K 16/00
310/112

(Continued)

FOREIGN PATENT DOCUMENTS

| CN | 101728926 B | 8/2011 |
| EP | 0380928 B1 | 8/1990 |

(Continued)

OTHER PUBLICATIONS

Sonceboz, Slimline Stepper Motors, 6407.

(Continued)

*Primary Examiner* — R. A. Smith
*Assistant Examiner* — Tania Courson (57) ABSTRACT

A stepper motor assembly, for use in an instrument panel in some applications, has a first rotor, a second rotor, a set of first electromagnets, and a set of second electromagnets. Each electromagnet is disposed adjacent to one of the first and second rotors and is configured to generate a magnetic field to rotate the respective rotor. The first rotor is configured to rotate a first shaft, wherein the first shaft extends from a first side of the stepper motor assembly. The second rotor is configured to rotate a second shaft, wherein the second shaft extends from a second side of the stepper motor assembly. The second side is opposite the first side. The first and second shafts are rotatable independently about a single shaft axis.

22 Claims, 4 Drawing Sheets

(56) References Cited

U.S. PATENT DOCUMENTS

| | | | | |
|---|---|---|---|---|
| 3,260,871 | A * | 7/1966 | Lang | H02K 37/14 310/156.43 |
| 3,631,476 | A * | 12/1971 | Schaffer | G01S 1/02 116/298 |
| 3,636,557 | A * | 1/1972 | Watkins | H02K 37/14 310/156.38 |
| 3,735,303 | A * | 5/1973 | Harden | G08B 5/24 335/272 |
| 4,501,981 | A * | 2/1985 | Hansen | H01F 7/08 310/209 |
| 4,517,478 | A * | 5/1985 | Oudet | H02K 37/125 310/268 |
| 4,682,171 | A * | 7/1987 | Nakamura | G05D 1/085 244/1 R |
| 5,218,251 | A * | 6/1993 | Allwine, Jr. | G01B 7/30 310/156.36 |
| 5,448,117 | A * | 9/1995 | Elliott | H02K 1/141 310/80 |
| 5,703,419 | A * | 12/1997 | Mizutani | H02K 37/14 310/156.26 |
| 5,847,475 | A * | 12/1998 | Rauch | G01R 7/06 310/49.47 |
| 6,520,108 | B1 * | 2/2003 | Komura | G01D 11/02 116/284 |
| 6,557,485 | B1 * | 5/2003 | Sauter | G01D 7/04 116/284 |
| 6,568,345 | B1 * | 5/2003 | Paulo | B60K 37/02 116/300 |
| 6,994,053 | B2 * | 2/2006 | Abe | G01D 11/24 116/284 |
| 7,023,123 | B2 * | 4/2006 | Suzuki | G01D 13/265 310/261.1 |
| 7,034,496 | B2 * | 4/2006 | Oishi | H02P 8/34 116/284 |
| 7,294,052 | B2 | 11/2007 | Dolan et al. | |
| 7,506,607 | B2 * | 3/2009 | Takato | B60K 37/02 116/286 |
| 7,999,427 | B2 * | 8/2011 | Wilson | H02K 49/106 310/114 |
| 8,222,777 | B2 | 7/2012 | Loussert et al. | |
| 8,427,095 | B2 | 4/2013 | Bilat et al. | |
| 8,534,218 | B2 * | 9/2013 | Ewers | B60K 37/02 116/300 |
| 9,074,913 | B2 * | 7/2015 | Watanabe | G01D 11/16 |
| 9,144,936 | B2 * | 9/2015 | Weldon | H02K 5/08 |
| 2004/0173025 | A1 * | 9/2004 | Hildebrand | G01D 7/04 73/700 |
| 2012/0304914 | A1 * | 12/2012 | Russ | H02P 8/22 116/201 |
| 2014/0002272 | A1 | 1/2014 | Braun | |

FOREIGN PATENT DOCUMENTS

| | | |
|---|---|---|
| EP | 0380928 B1 | 11/1994 |
| EP | 0793329 A1 | 3/1997 |
| EP | 0793329 A1 | 9/1997 |

OTHER PUBLICATIONS http://www.sonceboz.com/en/slimline-stepper-motor-instrument-cluster/, dated Jul. 2, 2014.
Stepper Motor, Slimline Stepper Motor for Instrument Clusters, www.sonceboz.com/en/slimline-steppe-motor-instrument-cluster/.
Sonceboz, Slimline Stepper Motors 6407.

* cited by examiner

STEPPER MOTOR ASSEMBLY HAVING OPPOSITE SHAFTS

TECHNICAL FIELD

The present disclosure relates to stepper motor assemblies, and more particularly, to a stepper motor assembly that may be used to rotate dials of an instrument panel in an automotive vehicle.

BACKGROUND

Vehicles include instrument clusters and gauges for communicating desired operating parameters such as vehicle speed, engine service needs, vehicle temperature, fuel level, among other operating parameters. Different methods and devices are known for communicating this information. Each method and device provides not only the function of communicating operating information to a driver, but also form and contribute to the style and aesthetic appearance of a vehicle interior. Accordingly, it is desirable to develop new and unique devices and methods for communicating and representing vehicle operating information to contribute to a desired appearance.

SUMMARY

Disclosed is a stepper motor assembly having two independently rotatable shafts, which may be used to control different indicators in an instrument panel assembly of a motor vehicle, while having a low weight and occupying little space within the interior of the instrument panel.

In one form, which may be combined with or separate from the other forms described herein, a stepper motor assembly is provided. The stepper motor assembly includes a first rotor and a second rotor. A plurality of first electromagnets is disposed adjacent to the first rotor. Each first electromagnet is configured to generate a magnetic field to rotate the first rotor about a first rotor axis. A plurality of second electromagnets is disposed adjacent to the second rotor. Each second electromagnet is configured to generate a magnetic field to rotate the second rotor about a second rotor axis. The first rotor is configured to rotate a first shaft, the first shaft extending from a first side of the stepper motor assembly. The second rotor is configured to rotate a second shaft, the second shaft extending from a second side of the stepper motor assembly. The second side is opposite the first side. The first and second shafts are rotatable independently about a single shaft axis.

In another form, which may be combined with or separate from the other forms described herein, an instrument panel assembly is provided. The instrument panel assembly includes a first rotor and a second rotor. A plurality of first electromagnets is disposed adjacent to the first rotor. Each first electromagnet is configured to generate a magnetic field to rotate the first rotor about a first rotor axis. A plurality of second electromagnets is disposed adjacent to the second rotor. Each second electromagnet is configured to generate a magnetic field to rotate the second rotor about a second rotor axis. The first rotor is configured to rotate a first shaft, the first shaft extending from a first side of the instrument panel assembly. The second rotor is configured to rotate a second shaft, the second shaft extending from a second side of the instrument panel assembly. The second side is opposite the first side. A printed circuit board is provided in communication with the pluralities of first and second electromagnets.

In yet another form, which may be combined with or separate from the other forms described herein, an instrument panel assembly is provided that includes a mask having a display side and a back side. The mask defines a first opening and a second opening therein. A first dial extends through the first opening of the mask, and a second dial extends through the second opening of the mask. A stepper motor assembly is disposed adjacent to the back side of the mask. The stepper motor assembly includes a first stepper motor and a second stepper motor. The first stepper motor is configured to rotate a first shaft, the first shaft extending from a first side of the stepper motor assembly. The first shaft is connected to the first dial, and the first shaft is configured to rotate the first dial. The second stepper motor is configured to rotate a second shaft, the second shaft extending from a second side of the stepper motor assembly. The second side is opposite the first side. The second shaft is connected to the second dial, and the second shaft is configured to rotate the second dial.

In still another form, which may be combined with or separate from the other forms described herein, a stepper motor assembly is provided that includes a first stepper motor and a second stepper motor. The first and second stepper motors are disposed in a housing. The first stepper motor is configured to rotate a first shaft, the first shaft extending from a first side of the housing. The second stepper motor is configured to rotate a second shaft, the second shaft extending from a second side of the housing. The second side is opposite the first side. The first and second shafts are rotatable about a single shaft axis.

Further features and advantages of the present disclosure will become apparent from consideration of the following description and the appended claims, when taken in connection with the accompanying drawings. It should be understood that the description and specific examples are intended for purposes of illustration only and are not intended to limit the scope of the present disclosure.

BRIEF DESCRIPTION OF THE DRAWINGS

Examples are reflected in the drawings, which will be described below. The drawings described herein are for illustration purposes only and are not intended to limit the scope of the present disclosure in any way. The drawings show:

FIG. 4B is a schematic cross-sectional view the variation of the inner portion of the stepper motor assembly of FIG.

4A, taken along the lines 3B-3B of FIG. 2, in accordance with the principles of the present disclosure.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
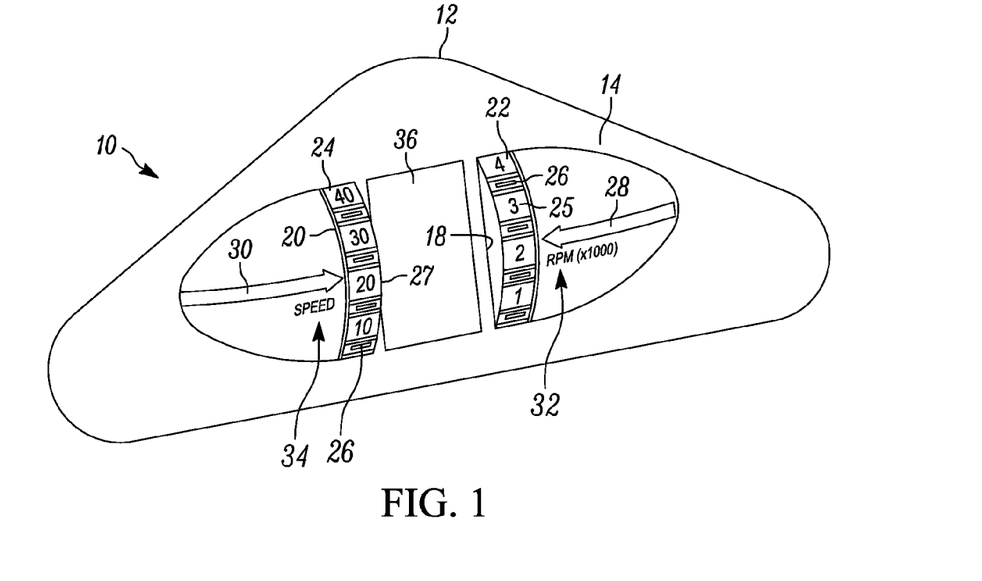
FIG. 1 is a perspective view of a display side of an instrument panel assembly, according to the principles of the present disclosure.
Figure 2:
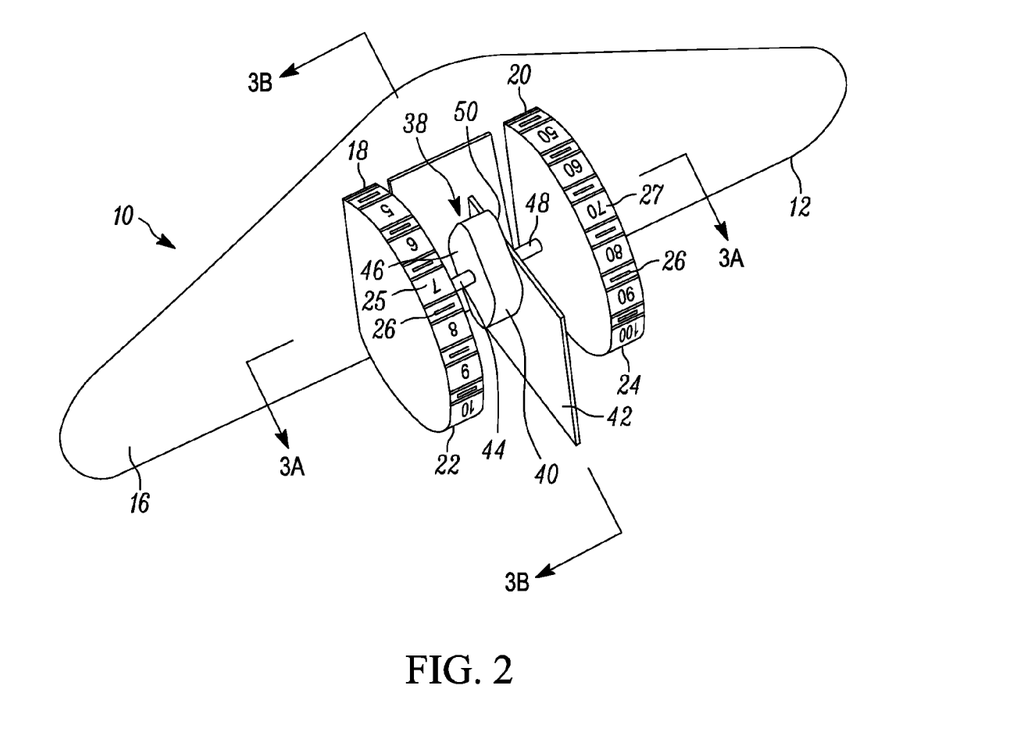
FIG. 2 is a perspective view of a back side of the instrument panel assembly of FIG. 1, in accordance with the principles of the present disclosure.

With reference to FIGS. 1-2, an instrument panel assembly in accordance with the present disclosure is illustrated and generally designated at 10. The instrument panel assembly 10 may be used in a motor vehicle, for example, to display certain operating parameters to a driver. Accordingly, the instrument panel assembly 10 may form part of the instrument cluster of the motor vehicle. Information given by the instrument panel assembly 10 may include, by way of example, tachometer information, vehicle speed information, fuel level information, engine temperature, or any other information that is desired to communicate to the driver of the vehicle.

The instrument panel assembly 10 includes a mask 12. The mask 12 has a display side 14 and a back side 16. The back side 16 is disposed opposite of the display side 14. The mask 12 may consist mostly of opaque material, in order to hide components that are disposed adjacent to the back side 16, such as circuitry and lighting assemblies. In the illustrated example, the mask 12 defines a first opening 18 and a second opening 20 in the mask 12. A first cylindrical dial 22 extends through the first opening 18, and a second cylindrical dial 24 extends through the second opening 20. Each of the dials 22, 24 may include a plurality of tick marks 26 or other indicators printed, engraved, or otherwise disposed around the circumferences of the dials 22, 24. In some examples, parameter values 25, 27 may also or alternatively be printed on the circumferences of the dials 22, 24. For example, the dials 22, 24 may include numerical values 25, 27 corresponding to speed, RPM, temperature, fuel level, or other operating parameters of the vehicle. The dials 22, 24 are rotatable, which will be described in further detail below.

The mask 12 may also have a first illuminatable pointer 28 corresponding to the first dial 22 and a second illuminatable pointer 30 corresponding to the second dial 24. Labels 32, 34 may be disposed adjacent to each pointer 28, 30, for example, to define which operating parameter each of the dials 22, 24 indicates. For example, the first dial 22 may be used to indicate engine revolutions per minute (RPM) as defined by the label 32, and the second dial 24 may be used to indicate vehicle speed, as defined by the label 34. Accordingly, when each dial 22, 24 rotates, the pointers 28, 30 point to a part of the circumference of the respective dial 22, 24 to indicate a parameter value 25, 27. A display 36, such as a thin film transistor or LCD display, may be disposed between the first and second dials 22, 24, by way of example, for indicating other operating parameters or other information of interest.

Referring now to FIG. 2, components disposed adjacent to the back side 16 of the mask 12 are shown. As described with respect to FIG. 1, the first and second dials 22, 24 extend through first and second openings 18, 20 formed in the mask 12. A stepper motor assembly 38 is disposed adjacent to the back side 16 of the mask 12. The stepper motor assembly 38 includes a housing 40 to house various components, some of which will be described below. In this example, the stepper motor assembly 38 is attached to a printed circuit board 42, which is operable to control the stepper motor assembly 38.

The stepper motor assembly 38 includes a first shaft 44 extending from a first side 46 of the housing 40, and a second shaft 48 extending from a second side 50 of the housing 40. The first and second sides 46, 50 are opposite of each other. In this example, each of the first and second sides 46, 50 are planar and parallel to each other, and disposed on opposite sides of the housing 40. The first shaft 44 is connected to the first dial 22, and the first shaft 44 is configured to rotate the first dial 22. The second shaft 48 is connected to the second dial 24, and the second shaft 44 is configured to rotate the second dial 24. In this example, the second shaft 48 extends through the printed circuit board 42 to the second dial 24, while the first shaft 44 does not extend through the printed circuit board 42.

Figure 3A:
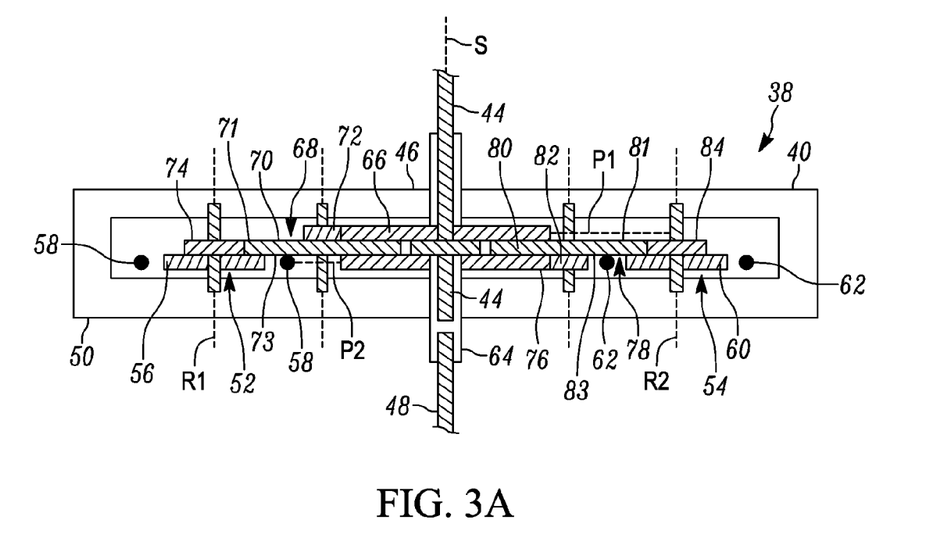
FIG. 3A is a schematic cross-sectional view of the instrument panel assembly of FIGS. 1-2, showing a variation of an inner portion of the stepper motor assembly of the instrument panel assembly, taken along the lines 3A-3A of FIG. 2, according to the principles of the present disclosure.
Figure 3B:
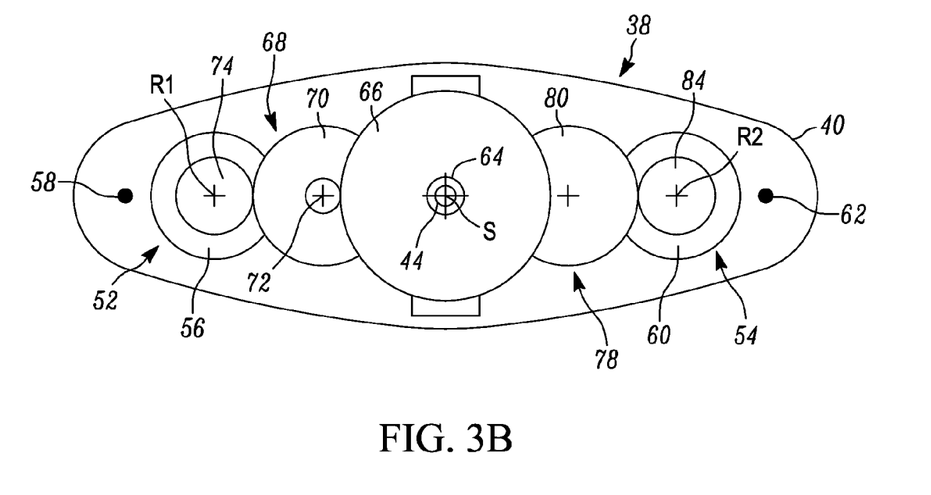
FIG. 3B is schematic cross-sectional view of the instrument panel assembly of FIGS. 1-3A, showing the variation of FIG. 3A, taken along the lines 3B-3B of FIG. 2, in accordance with the principles of the present disclosure.

Referring now to FIGS. 3A-3B, the inner workings of one version of the stepper motor assembly 38 are shown. The stepper motor assembly 38 generally includes a first stepper motor 52 and a second stepper motor 54. The first and second stepper motors 52, 54 may have any suitable configuration; for example, the stepper motors 52, 54 may be permanent magnet stepper motors, variable reluctance stepper motors, hybrid synchronous stepper motors, and/or Lavet type stepper motors.

The first stepper motor 52 includes a first rotor 56, which may be magnetic or have one or more permanent magnets disposed therein. Two electromagnets 58, such as electromagnetic coils, are illustrated being disposed adjacent to the first rotor 56; however, it should be understood that any desired number of electromagnets 58 could be used. When energy is applied to an electromagnet 58, the electromagnet 58 is configured to generate a magnetic field to rotate the first rotor 56 about a first rotor axis R1. The first rotor 56 is rotatable into various "stepped" positions by the electromagnets 58, as would be understood by one having ordinary skill in the art. The electromagnets 58 are in communication with, and controlled by, the printed circuit board 42.

Similarly, the second stepper motor 54 includes a second rotor 60, which may be magnetic or have one or more permanent magnets disposed therein. Two electromagnets 62 are illustrated being disposed adjacent to the second rotor 60; however, it should be understood that any desired number of electromagnets 62 could be used. When energy is applied to an electromagnet 62, the electromagnet 62 is configured to generate a magnetic field to rotate the second rotor 60 about a second rotor axis R2. The second rotor 60 is rotatable into various "stepped" positions by the electromagnets 62, as would be understood by one having ordinary skill in the art. The electromagnets 62 are in communication with, and controlled by, the printed circuit board 42.

The first rotor 56 is configured to rotate the first shaft 44, and the second rotor 60 is configured to rotate the second shaft 48. Since the first shaft 44 is connected to the first dial 22, and the second shaft 48 is connected to the second dial 24, the rotors 56, 60 (controlled by the electromagnets 58, 62, respectively) are able to move the dials 22, 24 into various "stepped" positions.

The first and second shafts 44, 48, extending from opposite sides 46, 50 of the housing 40, are disposed along a single shaft axis S, in this example. The second shaft 48 has a sleeve 64 that is concentrically disposed around the first shaft 44. Accordingly, the first and second shafts 44, 48 have the same axis of rotation S; however, each of the first and second shafts 44, 48 are rotatable independently of each other, as each is rotated by its respective stepper motor 52, 54.

The first shaft 44 has a first shaft gear part 66 extending from and coupled with the first shaft 44. The first shaft gear part 66 is disposed along a first plane P1 that is normal to the shaft axis S. A first intermediate gear 68 is disposed in meshing engagement with the first shaft gear part 66. The first intermediate gear 68 has a main gear part 70 connected to a smaller outer gear part 72. The main gear part 70 has a top side 71 and a bottom side 73, in the orientation of FIG. 3A. The outer gear part 72 is connected to the top side 71 of the main gear part 70. The outer gear part 72 is the portion of the intermediate gear 68 that meshes with the first shaft gear part 66. Accordingly, each of the outer gear part 72 and the first shaft gear part 66 may have corresponding teeth that mesh together.

The first rotor 56 has a first rotor gear part 74 that is in meshing engagement with the first intermediate gear 68, and more specifically in this example, with the main gear part 70 of the first intermediate gear 68. Thus, each of the first rotor gear part 74 and the main gear part 70 may have corresponding teeth that mesh together. Accordingly, as the first rotor 56 is rotated by one or more of the electromagnets 58, the first rotor gear part 74 causes the first intermediate gear 68 to rotate. As the first intermediate gear 68 rotates, the first shaft gear part 66 and the first shaft 44 rotate. The first shaft 44 rotates within the sleeve 64 without causing the sleeve 64 to rotate.

The second shaft 48 has a second shaft gear part 76 extending from and coupled with the second shaft 48. In this example, the second shaft gear part 76 is connected to the sleeve 64, which is connected to the second shaft 48. The second shaft gear part 76 is disposed along a second plane P2 that is normal to the shaft axis S. The first and second planes P1, P2 are non-coplanar. A second intermediate gear 78 is disposed in meshing engagement with the second shaft gear part 76. The second intermediate gear 78 has a main gear part 80 connected to a smaller outer gear part 82. The main gear part 80 has a top side 81 and a bottom side 83, in the orientation of FIG. 3A. The outer gear part 82 is connected to the bottom side 83 of the main gear part 80. The outer gear part 82 is the portion of the second intermediate gear 78 that meshes with the second shaft gear part 76. Accordingly, each of the outer gear part 82 and the second shaft gear part 76 may have corresponding teeth that mesh together.

The second rotor 60 has a second rotor gear part 84 that is in meshing engagement with the second intermediate gear 78, and more specifically in this example, with the main gear part 80 of the second intermediate gear 78. Thus, each of the second rotor gear part 84 and the main gear part 80 may have corresponding teeth that mesh together. Accordingly, as the second rotor 60 is rotated by one or more of the electromagnets 62, the second rotor gear part 84 causes the second intermediate gear 78 to rotate. As the second intermediate gear 78 rotates, the second shaft gear part 76 and the second shaft 48 rotate. The second shaft 48 is connected to the sleeve 64, which rotates around the first shaft 44 without causing the first shaft 44 to rotate.

As can be seen in FIG. 3A, the pluralities of first and second electromagnets 58, 62, the first and second rotors 56, 60, the first and second shaft gear parts 66, 76, and the first and second intermediate gears 68, 78 are disposed in the housing 40. The housing 40 is attached to the printed circuit board 42 (see FIG. 2).

While FIGS. 3A and 3B illustrate a specific gearing arrangement, it should be understood that the shafts 44, 48 may be driven by other configurations, without falling beyond the spirit and scope of the present disclosure. For example, the shafts 44, 48 may be driven by worm gears or various other gear arrangements, such as gear stacking.

Figure 4A:
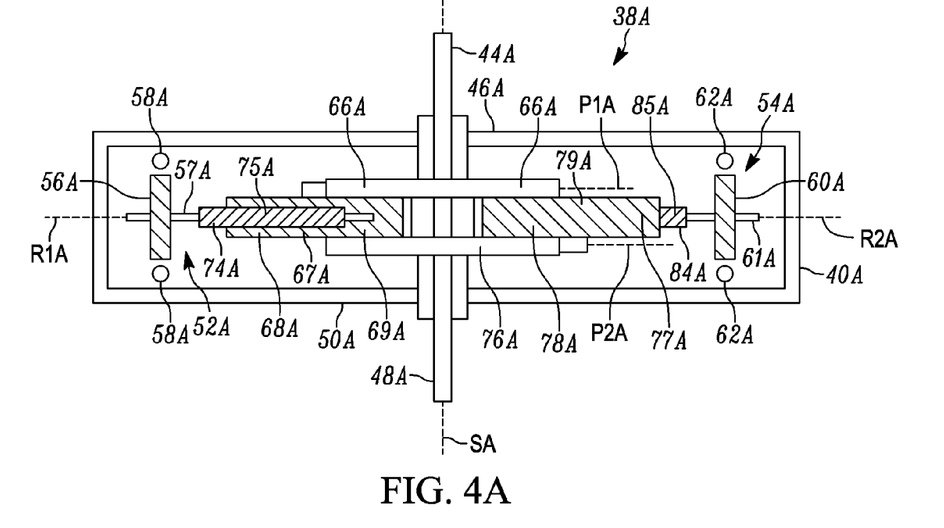
FIG. 4A is a schematic cross-sectional view of another variation of an inner portion of the stepper motor assembly of the instrument panel assembly of FIGS. 1-2, taken along the lines 3A-3A of FIG. 2, according to the principles of the present disclosure.
Figure 4B:
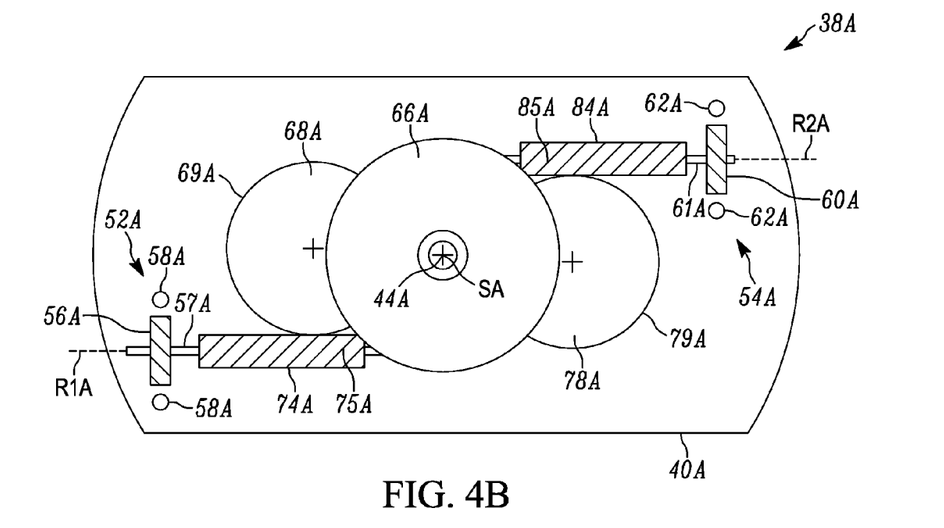

Referring now to FIGS. 4A-4B, another version of the inner workings of the stepper motor assembly 38 are illustrated. For purposes of distinguishing the example of FIGS. 3A-3B from FIGS. 4A-4B, the stepper motor assembly is illustrated at reference numeral 38A in FIGS. 4A-4B. The stepper motor assembly 38A generally includes a first stepper motor 52A and a second stepper motor 54A. The first and second stepper motors 52A, 54A may have any suitable configuration; for example, the stepper motors 52A, 54A may be permanent magnet stepper motors, variable reluctance stepper motors, hybrid synchronous stepper motors, and/or Lavet type stepper motors.

The first stepper motor 52A includes a first rotor 56A, which may be magnetic or have one or more permanent magnets disposed therein. Two electromagnets 58A, for example, electromagnetic coils, are illustrated being disposed adjacent to the first rotor 56A; however, it should be understood that any desired number of electromagnets 58A could be used. When energy is applied to an electromagnet 58A, the electromagnet 58A is configured to generate a magnetic field to rotate the first rotor 56A about a first rotor axis R1A. The first rotor 56A is rotatable into various "stepped" positions by the electromagnets 58A, as would be understood by one having ordinary skill in the art. The electromagnets 58A are in communication with, and controlled by, the printed circuit board 42, by way of example.

Similarly, the second stepper motor 54A includes a second rotor 60A, which may be magnetic or have one or more permanent magnets disposed therein. Two electromagnets 62A are illustrated being disposed adjacent to the second rotor 60A; however, it should be understood that any desired number of electromagnets 62A could be used. When energy is applied to an electromagnet 62A, the electromagnet 62A is configured to generate a magnetic field to rotate the second rotor 60A about a second rotor axis R2A. The second rotor 60A is rotatable into various "stepped" positions by the electromagnets 62A, as would be understood by one having ordinary skill in the art. The electromagnets 62A are in communication with, and controlled by, the printed circuit board 42, by way of example.

The first rotor 56A is configured to rotate the first shaft 44A, and the second rotor 60A is configured to rotate the second shaft 48A. The first shaft 44A is connected to the first dial 22, and the second shaft 48A is connected to the second dial 24, as shown in FIG. 2 as shafts 44, 48. Thus, the rotors 56A, 60A (controlled by the electromagnets 58A, 62A, respectively) are able to move the dials 22, 24 into various "stepped" positions.

The first and second shafts 44A, 48A extend from opposite sides 46A, 50A of the housing 40A (as shown in FIG. 2 as shafts 44, 48, housing 40, and sides 46, 50) and are disposed along a single shaft axis SA, in this example. Thus, the first and second shafts 44A, 48A have the same axis of rotation SA; however, each of the first and second shafts 44A, 48A are rotatable independently of each other, as each is rotated by its respective stepper motor 52A, 54A.

The first shaft 44A has a first shaft gear part 66A extending from and coupled with the first shaft 44A. The first shaft gear part 66A is disposed along a first plane HA that is normal to the shaft axis SA. A first main gear 68A is coupled to the first shaft gear part 66A, in this example. The first rotor 56A has a first rotor shaft 57A disposed along the first rotor axis R1A, about which the first rotor 56A rotates. The first rotor shaft 57A is coupled with a first worm gear 74A. The first worm gear 74A is in meshing engagement with the first main gear 68A. Thus, the first main gear 68A may have a plurality of teeth 67A disposed on an outer circumference edge 69A of the first main gear 68A, which mesh with helical turns 75A of the first worm gear 74A.

Accordingly, as the first rotor 56A is rotated by one or more of the electromagnets 58A, the first rotor shaft 57A causes the first worm gear 74A to rotate. As the first worm gear 74A rotates, the first main gear 68A, the first shaft gear part 66A, and the first shaft 44A rotate. The first shaft 44A rotates without causing the second shaft 48A to rotate.

The second shaft 48A has a second shaft gear part 76A extending from and coupled with the second shaft 48A. The second shaft gear part 76A is disposed along a second plane P2A that is normal to the shaft axis SA. The first and second planes HA, P2A are non-coplanar. A second main gear 78A is coupled to the second shaft gear part 76A, in this example. The second rotor 60A has a second rotor shaft 61A disposed along the second rotor axis R2A, about which the second rotor 60A rotates. The second rotor shaft 61A is coupled with a second worm gear 84A. The second worm gear 84A is in meshing engagement with the second main gear 78A. Thus, the second main gear 78A may have a plurality of teeth 77A disposed on an outer circumference edge 79A of the second main gear 78A, which mesh with helical turns 85A of the second worm gear 84A.

Accordingly, as the second rotor 60A is rotated by one or more of the electromagnets 62A, the second rotor shaft 61A causes the second worm gear 84A to rotate. As the second worm gear 84A rotates, the second main gear 78A, the second shaft gear part 76A, and the second shaft 48A rotate. The second shaft 48A rotates without causing the first shaft 44A to rotate.

As can be seen in FIG. 4A, the pluralities of first and second electromagnets 58A, 62A, the first and second rotors 56A, 60A, the first and second shaft gear parts 66A, 76A, and the first and second main gears 68A, 78A are disposed in a housing 40A. The housing 40A is attached to the printed circuit board 42 (shown as housing 40 in FIG. 2).

Figure 5:
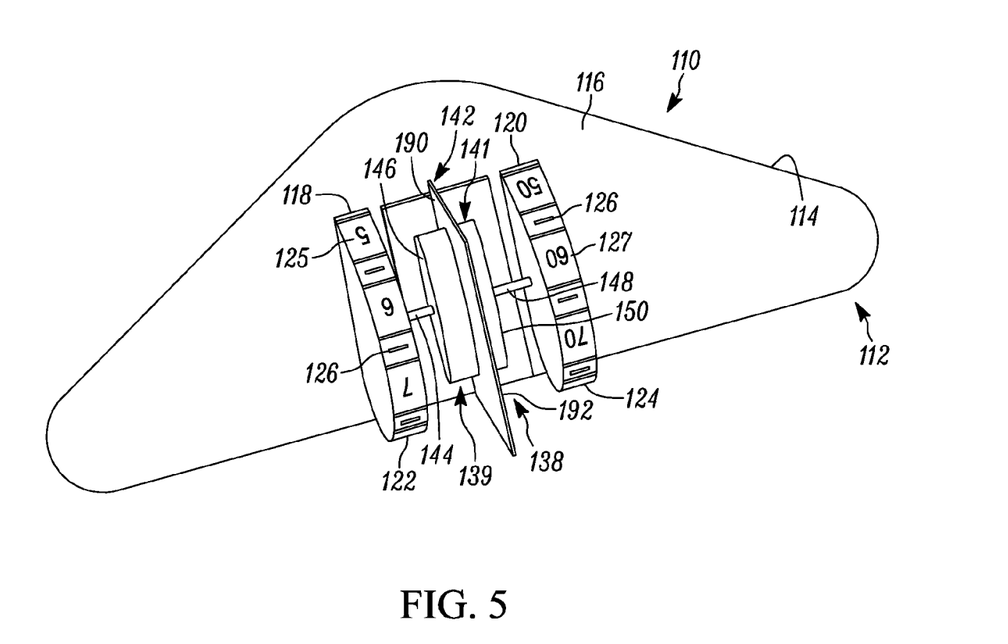
FIG. 5 is a perspective view of a back side of another instrument panel assembly, according to the principles of the present disclosure.

Referring now to FIG. 5, another example of an instrument panel assembly in accordance with the present disclosure is illustrated and generally designated at 110. The instrument panel assembly 110 may be used in a motor vehicle, for example, to display certain operating parameters to a driver, as described above with respect to the example of FIGS. 1-2.

The instrument panel assembly 110 includes a mask 112. The mask 112 has a display side 114 and a back side 116. The back side 116 is disposed opposite of the display side 114. The view of FIG. 5 is of the back side 116 and the components disposed adjacent thereto. The mask 112 may have similar features as the mask 12 described above, and that discussion is herein incorporated by reference. In the illustrated example, the mask 112 defines a first opening 118 and a second opening 120 in the mask 112. A first cylindrical dial 122 extends through the first opening 118, and a second cylindrical dial 124 extends through the second opening 120. Each of the dials 122, 124 may include a plurality of tick marks 126 or other indicators printed, engraved, or otherwise disposed around the circumferences of the dials 122, 124. In some examples, parameter values 125, 127 may also or alternatively be printed on the circumferences of the dials. For example, the dials 122, 124 may include numerical values 125, 127 corresponding to speed, RPM, temperature, fuel level, or other operating parameters of the vehicle. The dials 122, 124 are rotatable, which will be described in further detail below.

A stepper motor assembly 138 is disposed adjacent to the back side 116 of the mask 112. The stepper motor assembly 138 includes a first stepper motor assembly 139 and a second stepper motor assembly 141. In this example, the stepper motor assembly 138 is attached to a printed circuit board 142, which is operable to control the stepper motor assembly 138. More specifically, the first stepper motor assembly 139 is attached to a first side 190 of the printed circuit board 142, and the second stepper motor assembly 141 is attached to a second side 192 of the printed circuit board 142.

The stepper motor assembly 138 includes a first shaft 144 extending from a first side 146 of the stepper motor assembly 138, the first side 146 being a side of the first stepper motor assembly 139, and a second shaft 148 extending from a second side 150 of the stepper motor assembly 138, the second side 150 being a side of the second stepper motor assembly 141. The first and second sides 146, 150 are opposite of each other. In this example, each of the first and second sides 146, 150 are planar and parallel to each other, and disposed on opposite sides of the stepper motor assembly 138. The first shaft 144 is connected to the first dial 122, and the first shaft 144 is configured to rotate the first dial 122. The second shaft 148 is connected to the second dial 124, and the second shaft 144 is configured to rotate the second dial 124.

The first stepper motor assembly 139 contains components similar to those shown and described with respect to FIGS. 3A-3B or FIGS. 4A-4B that are associated with rotating the first shaft 44. In other words, the first stepper motor assembly 139 may include a first rotor and electromagnets associated therewith, a first rotor gear part or worm gear, a first intermediate or main gear, and a first shaft gear part, disposed within the housing of the first stepper motor assembly 139.

The second stepper motor assembly 141 contains components similar to those shown and described with respect to FIGS. 3A-3B or FIGS. 4A-4B that are associated with rotating the second shaft 48. In other words, the second stepper motor assembly 141 may include a second rotor and electromagnets associated therewith, a second rotor gear part or worm gear, a second intermediate or main gear, and a second shaft gear part, disposed within the housing of the second stepper motor assembly 141.

The first and second shafts 144, 148 may be disposed along a single shaft axis, or they may be disposed along different, non-collinear axes. The printed circuit board 142 is configured to control both the first and second stepper motor assemblies 139, 141, which may be operated independently of each other.

It is further understood that any of the above described concepts can be used alone or in combination with any or all of the other above described concepts. As a person skilled in the art will readily appreciate, the above description is meant as one illustration of the principles of the invention. This description is not intended to limit the scope or application of the invention in that the invention is susceptible to modification, variation, and change, without departing from the spirit and scope of the invention, as defined in the following claims.

What is claimed is:

1. A stepper motor assembly comprising:
a first rotor;
a second rotor;
a plurality of first electromagnets disposed adjacent to the first rotor, each first electromagnet being configured to generate a magnetic field to rotate the first rotor about a first rotor axis;
a plurality of second electromagnets disposed adjacent to the second rotor, each second electromagnet being configured to generate a magnetic field to rotate the second rotor about a second rotor axis;
a first shaft, the first rotor being configured to rotate the first shaft, the first shaft extending from a first side of the stepper motor assembly;
a second shaft, the second rotor being configured to rotate the second shaft, the first and second shafts being rotatable about a single shaft axis, the second shaft extending from a second side of the stepper motor assembly, the second side being opposite the first side;
a first shaft gear part extending from the first shaft and a second shaft gear part extending from the second shaft, the first shaft gear part being disposed along a first plane, the second shaft gear part being disposed along a second plane, the first and second planes being non-coplanar; and
a first intermediate gear in meshing engagement with the first shaft gear part, the first rotor having a first rotor gear part, the first intermediate gear being in meshing engagement with the first rotor gear part, the stepper motor assembly further comprising a second intermediate gear in meshing engagement with the second shaft gear part, the second rotor having a second rotor gear part, the second intermediate gear being in meshing engagement with the second rotor gear part.

2. The stepper motor assembly of claim 1, further comprising a printed circuit board in communication with the pluralities of first and second electromagnets.

3. The stepper motor assembly of claim 2, further comprising a first dial connected to the first shaft and a second dial connected to the second shaft, the first shaft being configured to rotate the first dial and the second shaft being configured to rotate the second dial.

4. The stepper motor assembly of claim 3, further comprising a mask having a first illuminatable pointer corresponding to the first dial and a second illuminatable pointer corresponding to the second dial.

5. The stepper motor assembly of claim 2, the second shaft having a sleeve concentrically disposed around the first shaft.

6. The stepper motor assembly of claim 5, wherein the second shaft gear part is disposed along the second plane normal to the shaft axis.

7. The stepper motor assembly of claim 6, further comprising a housing, the pluralities of first and second electromagnets, the first and second rotors, the first and second shaft gear parts, and the first and second intermediate gears being disposed in the housing.

8. The stepper motor assembly of claim 7, the housing being attached to the printed circuit board.

9. The stepper motor assembly of claim 8, one of the first and second shafts extending through the printed circuit board, the other of the first and second shafts not extending through the printed circuit board.

10. An instrument panel assembly comprising:
a first rotor;
a second rotor;
a plurality of first electromagnets disposed adjacent to the first rotor, each of the plurality of first electromagnets being configured to generate a magnetic field to rotate the first rotor about a first rotor axis;
a plurality of second electromagnets disposed adjacent to the second rotor, each of the plurality of second electromagnets being configured to generate a magnetic field to rotate the second rotor about a second rotor axis;
a first shaft, the first rotor being configured to rotate the first shaft, the first shaft extending from a first side of the instrument panel assembly;
a second shaft, the second rotor being configured to rotate the second shaft, the second shaft extending from a second side of the instrument panel assembly, the second side being opposite the first side;
a printed circuit board in communication with the pluralities of first and second electromagnets;
a first shaft gear part extending from the first shaft, the first shaft gear part being disposed along a first plane normal to a shaft axis;
a second shaft gear part extending from the second shaft, the second shaft gear part being disposed along a second plane normal to the shaft axis, the first and second planes being non-coplanar;
a first intermediate gear in meshing engagement with the first shaft gear part, the first rotor having a first rotor gear part, the first intermediate gear being in meshing engagement with the first rotor gear part; and
a second intermediate gear in meshing engagement with the second shaft gear part, the second rotor having a second rotor gear part, the second intermediate gear being in meshing engagement with the second rotor gear part.

11. The instrument panel assembly of claim 10, further comprising a first dial connected to the first shaft and a second dial connected to the second shaft, the first shaft being configured to rotate the first dial and the second shaft being configured to rotate the second dial.

12. The instrument panel assembly of claim 11, further comprising a mask having a first illuminatable pointer corresponding to the first dial and a second illuminatable pointer corresponding to the second dial.

13. The instrument panel assembly of claim 12, the first and second shafts being disposed along a single shaft axis, the second shaft having a sleeve concentrically disposed around the first shaft.

14. The instrument panel assembly of claim 13, further comprising:

a housing attached to the printed circuit board, the pluralities of first and second electromagnets, the first and second rotors, the first and second shaft gear parts, and the first and second intermediate gears being disposed in the housing.

15. An instrument panel assembly comprising:
a mask having a display side and a back side, the mask defining a first opening and a second opening in the mask;
a first dial extending through the first opening of the mask;
a second dial extending through the second opening of the mask; and
a stepper motor assembly disposed adjacent to the back side of the mask, the stepper motor assembly comprising:
   a first stepper motor, the first stepper motor comprises a first rotor and a plurality of first electromagnets, the first stepper motor rotating the first rotor about a first rotor axis;
   a second stepper motor, the second stepper motor comprising a second rotor and a plurality of second electromagnets, the second stepper motor rotating the second rotor about a second rotor axis;
   a first shaft, the first stepper motor being configured to rotate the first shaft, the first shaft extending from a first side of the stepper motor assembly, the first shaft being connected to the first dial, the first shaft being configured to rotate the first dial;
   a second shaft, the second stepper motor being configured to rotate the second shaft, the second shaft extending from a second side of the stepper motor assembly, the second side being opposite the first side, the second shaft being connected to the second dial, the second shaft being configured to rotate the second dial, wherein the first and second shafts are disposed along a single shaft axis;
   a first shaft gear part extending from the first shaft, the first shaft gear part being disposed along a first plane normal to the shaft axis;
   a second shaft gear part extending from the second shaft, the second shaft gear part being disposed along a second plane normal to the shaft axis, the first and second planes being non-coplanar;
   a first intermediate gear in meshing engagement with the first shaft gear part, the first rotor having a first rotor gear part, the first intermediate gear being in meshing engagement with the first rotor gear part; and
   a second intermediate gear in meshing engagement with the second shaft gear part, the second rotor having a second rotor gear part, the second intermediate gear being in meshing engagement with the second rotor gear part.

16. The instrument panel assembly of claim 15, further comprising a housing, the first and second stepper motors being disposed in the housing.

17. The instrument panel assembly of claim 16, wherein each first electromagnet is configured to generate a magnetic field to rotate the first rotor about the first rotor axis;
wherein the plurality of second electromagnets are disposed adjacent to the second rotor;
wherein each second electromagnet is configured to generate a magnetic field to rotate the second rotor about the second rotor axis; and
wherein the instrument panel assembly further comprises a printed circuit board in communication with the pluralities of first and second electromagnets.

18. The instrument panel assembly of claim 17, wherein the second shaft having a sleeve concentrically disposed around the first shaft.

19. The instrument panel assembly of claim 18, the mask having a first illuminatable pointer corresponding to the first dial and a second illuminatable pointer corresponding to the second dial.

20. The instrument panel assembly of claim 19, wherein the housing is attached to the printed circuit board.

21. A stepper motor assembly comprising:
a first stepper motor;
a second stepper motor;
a housing, the first and second stepper motors being disposed in the housing;
a first shaft, the first stepper motor being configured to rotate the first shaft, the first shaft extending from a first side of the housing;
a second shaft, the second stepper motor being configured to rotate the second shaft, the first and second shafts being rotatable about a single shaft axis, the second shaft extending from a second side of the housing, the second side being opposite the first side;
a first shaft gear part extending from the first shaft, the first shaft gear part being disposed along a first plane;
a second shaft gear part extending from the second shaft, the second shaft gear part being disposed along a second plane, the first and second planes being non-coplanar;
a first intermediate gear in meshing engagement with the first shaft gear part, the first stepper motor having a first rotor, the first rotor having a first rotor gear part, the first intermediate gear being in meshing engagement with the first rotor gear part; and
a second intermediate gear in meshing engagement with the second shaft gear part, the second stepper motor having a second rotor, the second rotor having a second rotor gear part, the second intermediate gear being in meshing engagement with the second rotor gear part.

22. The stepper motor assembly of claim 21, further comprising:
a printed circuit board attached to the housing, the printed circuit board being in communication with the first and second stepper motors;
a first dial connected to the first shaft, the first shaft being configured to rotate the first dial;
a second dial connected to the second shaft, the second shaft being configured to rotate the second dial;
a mask defining a first opening and a second opening, the first dial extending through the first opening and the second dial extending through the second opening; and
wherein the second shaft has a sleeve concentrically disposed around the first shaft.

* * * * *